United States Patent Office 3,313,742
Patented Apr. 11, 1967

3,313,742
HIGH MOLECULAR WEIGHT α,β-CHLOROHYDRIN ETHER CONDENSATION PRODUCTS AND THEIR PREPARATION
Walter Dürsch, Frankfurt am Main, Germany, assignor to Farbwerke Hoechst Aktiengesellschaft vormals Meister Lucius & Brüning, Frankfurt am Main, Germany, a corporation of Germany
No Drawing. Filed Oct. 6, 1964, Ser. No. 401,962
Claims priority, application Germany, Oct. 12, 1963, F 40,973
11 Claims. (Cl. 260—2)

The present invention provides high molecular weight α,β-chlorohydrin ethers which are stable in storage, free from epoxide and contain tertiary and quaternary basic nitrogen atoms, polyalkylene oxide radicals and more than two α,β-chlorohydrin groups, and a process for preparing the said ethers.

It is known to react epichlorohydrin with tertiary bases containing a radical with a hydroxyl group to obtain 1-chloro-2-hydroxypropane-3-N-alkylamino-alkyl ethers. Still further, epichlorohydrin has been allowed to act, in the absence of Friedel-Crafts catalyst, on the reaction products of aliphatic polyvalent amines and ethylene oxide, whereby quaternary ammonium compounds containing epoxide groups in the molecule are obtained. The reaction of polyethylene glycols with epichlorohydrin in the presence of Friedel-Crafts catalysts has likewise been described. Moreover, reaction products of 1 mol of a compound with at least 3 active hydrogen atoms with at least 3 mols of alkylene oxide have been transformed into polyglycidyl ethers by reacting the said reaction products with at least 2 mols of epichlorohydrin in the presence of Friedel-Crafts catalyst with subsequent splitting off of hydrogen chloride in the presence of alkalies. Polyglycidyl ethers having tertiary basic nitrogen atoms in the molecule, which have been prepared under the aforesaid conditions, contain relatively little epoxide oxygen and after some time they undergo cross-linking, especially in the presence of water with polyquaternization to yield insoluble resins.

It has now been found that novel and valuable high molecular weight compounds which are stable in storage, free from epoxide groups and contain tertiary and quaternary basic nitrogen atoms, polyalkylene oxide radicals and more than two α,β-chlorohydrin groups can be obtained by reacting hydroxylalkylates of alkanolamines with at least one tertiary basic nitrogen atom and at least 3 hydroxyl groups in the molecule, in the presence of Friedel-Crafts catalysts, with at least 3 mols of epichlorohydrin and subsequently heating the polyvalent, α,β-chlorohydrin ethers obtained at most to a temperature at which resinification sets in.

As hydroxyalkylates of alkanol amines with at least one tertiary basic nitrogen atom and at least 3 hydroxyl groups in the molecule there can be used in the first place the reaction products of ammonia or polyalkylenepolyamines, preferably those having up to 4 alkylene groups each containing preferably 2 to 4 carbon atoms, such as ethylene diamine, propylene diamine, diethylene triamine, triethylene tetramine, tetraethylene pentamine, with about 6 to 350 moles of alkylene oxide, preferably 20–250 moles of ethylene oxide and propylene oxide or isobutylene oxide. The said hydroxyalkylates can likewise be prepared from alkanol amines, such as triethanol amine or diethanol amine, obtained by replacing wholly or partially the hydrogen atoms on the basic nitrogen atom by hydroxyalkyl radicals. Alternatively, mixtures of various alkylene oxides can be used, for example a mixture of ethylene oxide and propylene oxide.

As Friedel-Crafts catalysts boron trifluoride (-etherate) and tin tetrachloride have proved to be especially advantageous. The hydroxyalkylates are preferably reacted with epichlorohydrin in the following manner: the hydroxyalkylates are mixed at a temperature below 60° C. with about 0.1 to 3%, calculated on their weight, of a Friedel-Crafts catalyst, in an oxygen-free nitrogen atmosphere with the exclusion of water, and epichlorohydrin is slowly added at a temperature of 70 to 140° C. The generated reaction heat must be dissipated. When the addition of epichlorohydrin is terminated, the reaction mixture is further heated for a prolonged period of time at a temperature in the range of from 90 to 140° C. until the epoxide content has dropped to zero and the desired degree of condensation is reached.

To control the degree of condensation it has proved advantageous to measure the turbidity points obtained when samples of the reaction mixture are mixed with solutions of salts, for example sodium chloride or sodium sulfate, and slowly heated. The determination of the viscosity is likewise suitable. The degree of condensation shall not exceed a definite value which can be exactly fixed by measurements of the viscosity or the turbidity points since otherwise resinous portions are formed which are difficultly soluble or insoluble in water.

The amount of epichlorohydrin used for each hydroxyl group of the hydroxyalkylate depends on the desired properties of the reaction products. Mixtures which rapidly condense to form high molecular weight products are obtained when about 1.1 to 2 mols of epichlorohydrin are used for each hydroxyl group. The time in which especially valuable products of high degree of condensation are obtained depends not only on the molar ratio of the reactants but also on the number of tertiary basic nitrogen atoms contained in the starting hydroxyalkylate, on the polyalkylene oxide or propylene oxide content and on the reaction temperature. To avoid the formation of insoluble resins it is necessary to find out the most favorable temperatures for the transformation of the primarily formed polyvalent α,β-chlorohydrin ethers into high molecular weight compounds by control of the degree of condensation in preliminary tests. The temperatures are preferably chosen in a manner such that the formation of insoluble resins sets in after about 1 to 20 hours so that the increase in the degree of condensation can be readily controlled.

With mixtures the degree of condensation of which is not very high, the cross-linking reaction can be interrupted by cooling to room temperature; with mixtures of high degree of condensation, water and/or a small amount of acid must be added while the mixture is simultaneously cooled to room temperature. When the products obtained are to be stored for a prolonged period of time, either in substance or in the form of solutions (mostly aqueous solutions) it is suitable to reduce the pH value to about 4–6.5 by the addition of acid. The products are stable in storage at room temperature for an unlimited period of time especially in the form of a weakly acid aqueous solution to about 40–50% strength. They differ from the known polyvalent epoxides free from nitrogen and containing polyalkylene oxide radicals, and the reaction products thereof with monofunctional amines in that they have a higher molecular weight owing to the after-heating treatment, contain more than 3 reactive functions in the molecule and, therefore, have absolutely different properties.

In the presence of calculated amounts of alkalies, the products according to the invention can be transformed into valuable soluble intermediate products by reacting the chlorohydrin groups partially or completely with ammonia, monofunctional amines, monofunctional mercapto compounds, sodium bisulfite or sodium thiosulfate. The said intermediate products are partially capable of being further cross-linked and can be used as textile and dyeing auxiliaries. As far as the products of the invention contain tertiary nitrogen atoms they can be quaternized in known manner, for example with alkylation agents. The compounds thus obtained likewise represent valuable textile auxiliaries.

When the products of the invention or the modified compounds obtained therefrom by partially reacting the chlorohydrin groups with monofunctional substances are reacted with amines, polyvalent mercapto compounds or sodium sulfide in the presence of alkalies, insoluble resins are obtained which are especially interesting in the manufacture of gels or in finishing textiles.

The following examples serve to illustrate the invention but they are not intended to limit it thereto.

Example 1

150 grams of triethanol amine were hydroxyethylated according to a known method with 1,350 grams of ethylene oxide in the presence of 1.5 grams of solid sodium hydroxide. 7 grams of gaseous boron trifluoride were introduced at room temperature in an oxygen-free nitrogen atmosphere with the exclusion of moisture. The mixture was heated to 80° C. and 462 grams of epichlorohydrin were stirred in over a period of 45 minutes. The reaction mixture was maintained at 120–130° C. until the turbidity point of a mixture of 1 gram of reaction product and 9 milliliters of sodium chloride solution of 5% strength had dropped to 56–58° C. and a distinct increase in viscosity could be observed. The reaction was interrupted by adding 2,940 grams of water and 10 milliliters of concentrated hydrochloric acid and the reaction mixture was cooled to room temperature. A slightly yellow solution of about 40% strength of a high molecular weight, epoxide-free, polyfunctional $\alpha,\beta$-chlorohydrin ether was obtained which was stable in storage.

The reaction took a similar course when 15 milliliters of anhydrous tin tetrachloride were used as catalyst instead of the indicated amount of boron trifluoride.

Example 2

103 grams of diethylene triamine were reacted according to a known method with 951 grams of ethylene oxide in the presence of 1 gram of metallic sodium and 30 milliliters of boron trifluoride etherate were slowly stirred into the hydroxyethylation product at room temperature. The mixture was heated to 80° C. and in an oxygen-free atmosphere 646 grams of epichlorohydrin were added over a period of about 70 minutes with the exclusion of moisture. The temperature was then raised to 120° C. After about 1 hour the reaction mixture became so viscous that it mounted on the stirrer. A mixture of 1 gram of the high molecular weight reaction product and 9 milliliters of sodium chloride solution of 5% strength had a turbidity point of 62° C. The epoxide content was zero. After the addition of 2,550 grams of water and cooling to room temperature a viscous, brownish-yellow solution of about 40% strength was obtained which was adjusted to pH 6 with concentrated hydrochloric acid.

Example 3

1,100 grams of an addition product of ethylene diamine and propylene oxide having a molecular weight of 2,500–3,000, which had been further reacted with ethylene oxide to a total content of 70–79% by weight of polyethylene oxide in the polyalkylene oxide radicals, were heated to 80° C. in a nitrogen atmosphere and remainders of water, if any, were removed under reduced pressure. 25 milliliters of boron trifluoride etherate were added and 56 grams of epichlorohydrin were stirred in. After 60 minutes the temperature was raised to 120° C. and maintained at that height for 4 hours. After said time the turbidity point of a mixture of 1 gram of reaction product and 9 milliliters of sodium chloride solution of 5% strength had dropped to 67° C. (The starting product had a turbidity point of 82° C.) The final product had an epoxide content of zero. By dilution with water a stable solution of 33% strength was obtained.

Example 4

2,600 grams of hydroxyethylated triethanol amine having a molecular weight of 2,600 were reacted as described in Example 1 with 560 grams of epichlorohydrin in the presence of 10 milliliters of boron trifluoride etherate. After having stirred for 3 hours at 120° C. a mixture of 1 gram of reaction product and 9 milliliters of sodium chloride solution of 5% strength had a turbidity point of 78° C. After 5 hours the turbidity point was at 68° C. after 7 hours it was at 63° C. and after 14 hours it was at 58° C. When the latter degree of condensation was reached 3,160 grams of water were added whereby a solution of 50% strength was obtained which was stable in storage and had an epoxide content of zero.

Example 5

335 grams of 1,2-propylene oxide were dropped at 160° C. into a solution of 1 gram of metallic sodium in 59.6 grams of triethanol amine in a manner such that the internal temperature did not drop. The hydroxypropylate obtained was soluble in water. 1.5 milliliters of boron trifluoride etherate were added at room temperature to 98.4% grams of the reaction mixture and 46.2 grams of epichlorohydrin were slowly added in a nitrogen atmosphere at 80° C. The mixture was then stirred for 7 hours at 120–130° C. whereby a distinct increase in viscosity could be observed. The reaction product was insoluble in water. 200 milliliters of isopropanol and hydrochloric acid of about 18% strength were added until the reaction mixture was weakly acid, and the precipitated salts were separated. A solution of about 48% strength in isopropanol was obtained.

I claim:

1. A process for preparing a high molecular weight $\alpha,\beta$-chlorohydrin ether condensation product containing quaternary basic nitrogen atoms which comprises (A) admixing at a temperature below about 60° C. under anhydrous conditions and in an oxygen-free atmosphere, a hydroxyalkylate of an alkanolamine having at least one tertiary basic nitrogen atom and at least three hydroxyl groups in the molecule with about 0.1 to 3% by weight of a Friedel-Crafts catalyst, (B) adding thereto, at a temperature of about 70 to 140° C., at least three mols epichlorohydrin per mol of hydroxyalkylate, and (C) maintaining the reaction mixture at a temperature in the range of from 90 to 140° C. until the epoxide content thereof has been reduced substantially to zero and the desired degree of condensation is reached.

2. The process defined in claim 1 wherein the hydroxyalkylate is the reaction product of ammonia or a polyalkylene polyamine with at least six mols of an alkylene oxide per mol of ammonia or amine, the alkylene groups of said amine and oxide containing up to four carbon atoms each.

3. The process defined in claim 1 wherein the hydroxyalkylate is the reaction product of 6 to 350 mols of alkylene oxide per mole of ammonia or polyalkylenepolyamine, the alkylene groups of said amine and oxide containing up to four carbon atoms each.

4. The process defined in claim 1 wherein the hydroxyalkylate is the reaction product of a polyalkylene polyamine having up to four alkylene groups each containing from two to four carbon atoms and from 20 to 250 mols, per mol of amine, of an alkylene oxide containing two to four carbon atoms per molecule.

5. The process defined in claim 1 wherein the hydroxyalkylate is the reaction product of an alkanol amine with an alkylene oxide, the alkylene groups of which contain up to four carbon atoms.

6. The process defined in claim 1 wherein the hydroxyalkylate is the reaction product of triethanolamine with ethylene oxide.

7. The process defined in claim 1 wherein the hydroxyalkylate is the reaction product of triethanolamine with propylene oxide.

8. The process defined in claim 1 wherein the hydroxyalkylate is the reaction product of diethylene triamine with ethylene oxide.

9. The process defined in claim 1 wherein the hydroxyalkylate is the reaction product of ethylene diamine with ethylene oxide and propylene oxide.

10. A process as claimed in claim 1, which comprises using as Friedel-Crafts catalyst a member selected from the group consisting of boron trifluoride, boron trifluoride etherate and tin tetrachloride.

11. A high molecular weight $\alpha,\beta$-chlorohydrin ether condensation product prepared as defined in claim 1.

References Cited by the Examiner

UNITED STATES PATENTS

| 2,864,775 | 12/1958 | Newey | 260—2 |
| 2,921,050 | 12/1960 | Belanger | 260—2 |

FOREIGN PATENTS 869,073  3/1953  Germany.

WILLIAM H. SHORT, *Primary Examiner.*

T. PERTILLA, *Assistant Examiner.*